United States Patent
Bae et al.

(10) Patent No.: US 8,621,219 B2
(45) Date of Patent: Dec. 31, 2013

(54) COMMUNICATION SYSTEM HAVING PLURAL TERMINALS AND METHOD FOR CONTROLLING TERMINAL IN COMMUNICATION SYSTEM

(75) Inventors: Eun Hui Bae, Seoul (KR); Yong Chang, Gyeonggi-do (KR); Hyoung Kyu Lim, Seoul (KR); Sung Jin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 191 days.

(21) Appl. No.: 13/091,859

(22) Filed: Apr. 21, 2011

(65) Prior Publication Data

US 2011/0264914 A1    Oct. 27, 2011

(30) Foreign Application Priority Data

Apr. 21, 2010    (KR) .................. 10-2010-0036781

(51) Int. Cl.
*G06F 21/00*    (2006.01)

(52) U.S. Cl.
USPC ........... 713/170; 455/352; 455/419; 370/278; 726/1; 709/218; 709/225

(58) Field of Classification Search
USPC ........................................................ 713/170
See application file for complete search history.

(56) References Cited

U.S. PATENT DOCUMENTS

| | | | | |
|---|---|---|---|---|
| 7,027,808 B2 * | 4/2006 | Wesby | .......................... | 455/419 |
| 7,158,006 B2 * | 1/2007 | Lee et al. | ..................... | 340/5.61 |
| 7,577,717 B2 * | 8/2009 | Smith | .......................... | 709/218 |
| 7,778,654 B2 * | 8/2010 | Ahn et al. | ..................... | 455/466 |
| 7,869,800 B2 * | 1/2011 | Netanel et al. | ................ | 455/418 |
| 7,894,832 B1 * | 2/2011 | Fischer et al. | ................ | 455/466 |
| 8,032,749 B2 * | 10/2011 | Straub et al. | ..................... | 713/170 |
| 8,205,240 B2 * | 6/2012 | Ansari et al. | ..................... | 726/1 |
| 8,301,117 B2 * | 10/2012 | Keast et al. | .................... | 455/411 |
| 2005/0044225 A1 | 2/2005 | Ota et al. | | |
| 2005/0044254 A1 * | 2/2005 | Smith | .......................... | 709/231 |
| 2005/0073388 A1 * | 4/2005 | Lee et al. | ....................... | 340/5.1 |
| 2005/0222933 A1 * | 10/2005 | Wesby | ........................... | 705/36 |
| 2006/0178777 A1 | 8/2006 | Park et al. | | |
| 2006/0217104 A1 * | 9/2006 | Cho | ............................. | 455/352 |
| 2007/0197236 A1 * | 8/2007 | Ahn et al. | ..................... | 455/466 |
| 2008/0057921 A1 * | 3/2008 | Baik | .......................... | 455/414.1 |
| 2008/0189774 A1 * | 8/2008 | Ansari et al. | ..................... | 726/7 |
| 2010/0217837 A1 * | 8/2010 | Ansari et al. | ................. | 709/218 |
| 2010/0227605 A1 * | 9/2010 | Fournier | ....................... | 455/419 |
| 2010/0241748 A1 * | 9/2010 | Ansari et al. | ................. | 709/225 |

FOREIGN PATENT DOCUMENTS

KR    1020060060392    6/2006
WO    WO 2009/020264    2/2009

OTHER PUBLICATIONS

Proposal and Testbed System of Inter Radio System Switching for Cognitive Radio|http://ieeexplore.ieee.org/stamp/stamp.jsp?tp=&arnumber=4549793|Hanaoka et al.|pp. 1-6|2007.*

* cited by examiner

*Primary Examiner* — Mahfuzur Rahman
(74) *Attorney, Agent, or Firm* — The Farrell Law Firm, P.C.

(57) ABSTRACT

A method and communication system for assigning the control authorization for controlling functions of a device from a terminal to another terminal in a communication system is provided. Through the method, it is possible to simplify the authentication process of a terminal having the communication function based on the short messaging service, and to reduce the security information size generated in the authentication process.

6 Claims, 7 Drawing Sheets

COMMUNICATION SYSTEM HAVING PLURAL TERMINALS AND METHOD FOR CONTROLLING TERMINAL IN COMMUNICATION SYSTEM

PRIORITY

This application claims priority under 35 U.S.C. §119 to an application filed in the Korean Intellectual Property Office on Apr. 21, 2010 and assigned Serial No. 2010-0036781, the content of which is incorporated herein by reference.

BACKGROUND OF THE INVENTION

1. Field of the Invention

The present invention relates generally to a communication system having a plurality of terminals that are controlled by a server and are interconnected via various communication networks and a method therefore, and in particular, to a method and communication system for assigning the control authorization for controlling functions of a certain device from a terminal to another terminal in a system where a plurality of terminals are connected via various communication networks.

2. Description of the Related Art

Communication terminals are being increasingly equipped with communication functions, as communication technologies such as short-range wireless communication and Worldwide Interoperability for Microwave Access (WiMAX) have evolved. In the ubiquitous environment based on such communication technologies, a user can control functions of a terminal irrespective of current position, and may share data using a terminal having the communication function.

A chief concern in the system supporting data sharing among terminals involves security. In order to ensure security while controlling the terminals, various security solutions based on authorization certificate and Internet Protocol Security (IPSec) have been proposed. Among them, the IPSec is a protocol suite for securing communication at the packet level in a network and allows processing the security-related processes without modification of the terminal.

However, the authorization process of the IPSec security solution is complicated, particularly when using a terminal devoid of an authorization certificate or short message generated by a widget installed in the terminal.

Particularly, when the authorization process performed based on IPSec for controlling the terminal in a non-session process with short messages, the control message for controlling the terminal becomes larger than the security information for authorization certificate or IPSec authentication in size, resulting in inefficiency. Also, the ID and password-based authentication method is vulnerable in security for control of terminal.

SUMMARY OF THE INVENTION

An aspect of the present invention is to address at least the above-mentioned problems and/or disadvantages and to provide at least the advantages described below.

In accordance with an aspect of the present invention, a terminal control method is provided, including receiving from a first terminal an authorization assignment request message for assigning control authorization on a third terminal which executes a function in response to an external command, generating a one-time secret key as a result of checking a second terminal to which the control authorization is assigned, determining, after transmitting the one-time secret key, whether a remote control request message for controlling the third terminal is received from the second terminal, and sending, when the remote control request message is received with the one-time secret key valid, the third terminal the remote control request message.

In accordance with an aspect of the present invention, a terminal control communication system is provided, including a first terminal which assigns control authorization for controlling a function execution terminal executing a function in response to an external command, a terminal management server which generates, when an authorization assignment request message is received from the first terminal, a one-time secret key to another terminal, and a second terminal to which the control authorization is assigned and which controls the function execution terminal based on the assigned control authorization.

BRIEF DESCRIPTION OF THE DRAWINGS

The above and other aspects, features, and advantages of the present invention will be more apparent from the following detailed description in conjunction with the accompanying drawings, in which.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are not to be regarded as exclusive. Accordingly, those of ordinary skill in the art will recognize that various changes and modifications of the embodiments described herein can be made without departing from the scope and spirit of the invention. In addition, descriptions of well-known functions and constructions may be omitted for the sake of clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
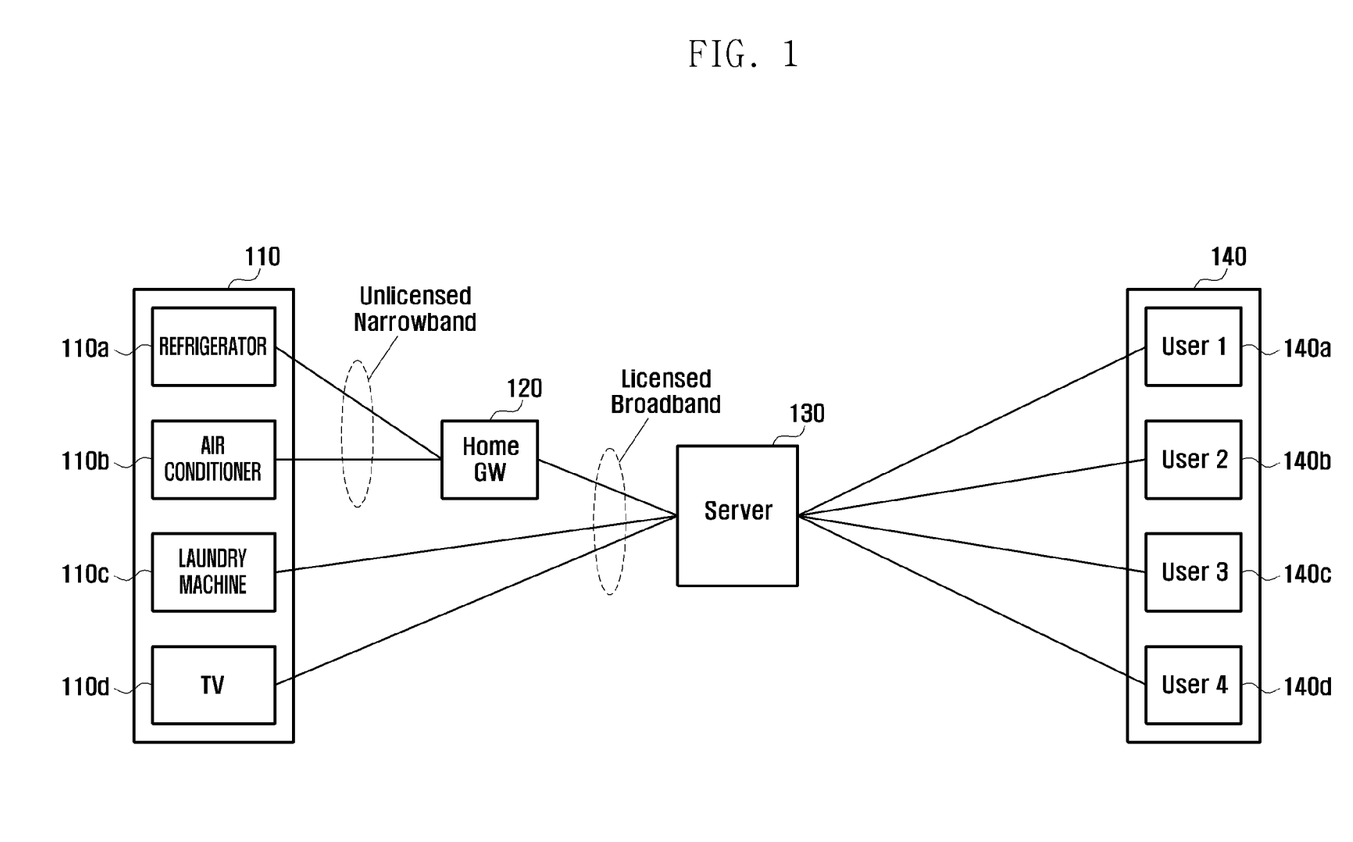
FIG. 1 illustrates a structure of a communication system according to an embodiment of the present invention.

FIG. 1 illustrates a structure of a communication system according to an embodiment of the present invention.

Referring to FIG. 1, the communication system includes a plurality of function execution terminals (Machine to Machine or M2M) 110 for executing various functions according to the control command transmitted by another terminal, a home gateway 120 for supporting communication of data among the terminals, a terminal management server 130 for providing intelligent communication service between terminals or between terminal and user, and control terminals 140 for controlling the function execution terminals 110.

Each of the function execution terminals 110 is a terminal executing a specific function according to the control signal input from outside. Particularly, the execution terminal 110 is provided with a WiFi™ or Long Term Evolution (LTE) module to receive a remote control message transmitted by another terminal via a communication network and executes a function according to the remote control message. The function execution terminals 110 can include domestic appliances such as a refrigerator 110a, an air conditioner 110b, a laundry machine 110c, a Television (TV) 110d, an audio device (not shown) and a computer (not shown), and office appliances such as a facsimile (not shown), a printer (not shown), and a copier machine (not shown).

The terminal management server 130 is for performing delivery of the authorization from the authorization assignor terminal to the authorization assignee terminal. The terminal management server can be an Internet Protocol Multimedia Service (IMS)-based application server or a non-IMS-based application server. The terminal management server 130 can be a Machine to Machine (M2M) convergence server.

The control terminals 140 include the terminals 140a, 140b, 140c, and 140d such as a mobile terminal and a remote controller that can be used to control other terminals. Each of the control terminals 140 can be classified into an authorization assignor or assignee terminal. The authorization assignor terminal has authorization for controlling a function execution terminal and can assign the control authorization for the function execution terminal to another control terminal. When the control authorization is assigned from the authorization assignor terminal, the authorization assignee terminal can remotely control the corresponding function execution terminal.

In the above-structured communication system, the authorization assignor terminal can assign the control authorization of the function execution terminal to the authorization assignee terminal via the terminal management server 130, which generates a one-time secret key to the authorization assignee terminal. In order to remotely control the function execution terminal, the authorization assignee terminal sends a remote control request message including the one-time secret key to the terminal management server 130. The terminal management server 130 authenticates the authorization assignee terminal based on the one-time secret key included in the remote control request message.

The terminal management server 130 sends the remote control request message to the function execution terminal such that the function execution terminal executes the corresponding function. The terminal management server 130 can generate a new one-time secret key to the authorization assignee terminal when the remote control request message is received again from the authentication assignee terminal. In this manner, the authorization assigner terminal can re-acquire the remote control of the function execution terminal.

In this embodiment, the description is directed to an instance when the authorization assignment for remote control is performed by the IMS Session Initiation Protocol (SIP) signaling, which is a Non-session-based signaling including an SIP MESSAGE instead of a Session-based signaling with SIP INVITE. Alternatively, Short Messaging Service (SMS) can be used for exchanging the control messages.

A method for assigning control authorization and controlling a function execution terminal with the assigned control authorization according to an embodiment of the present invention is described with reference to FIGS. 2 to 7. In the following, the description is made with a User Equipment-a (UE-a) as the authorization assignor terminal, an M2M convergence server as the terminal management server, a UE-b as the authorization assignee terminal, and an M2M device as the function execution terminal.

Figure 2:
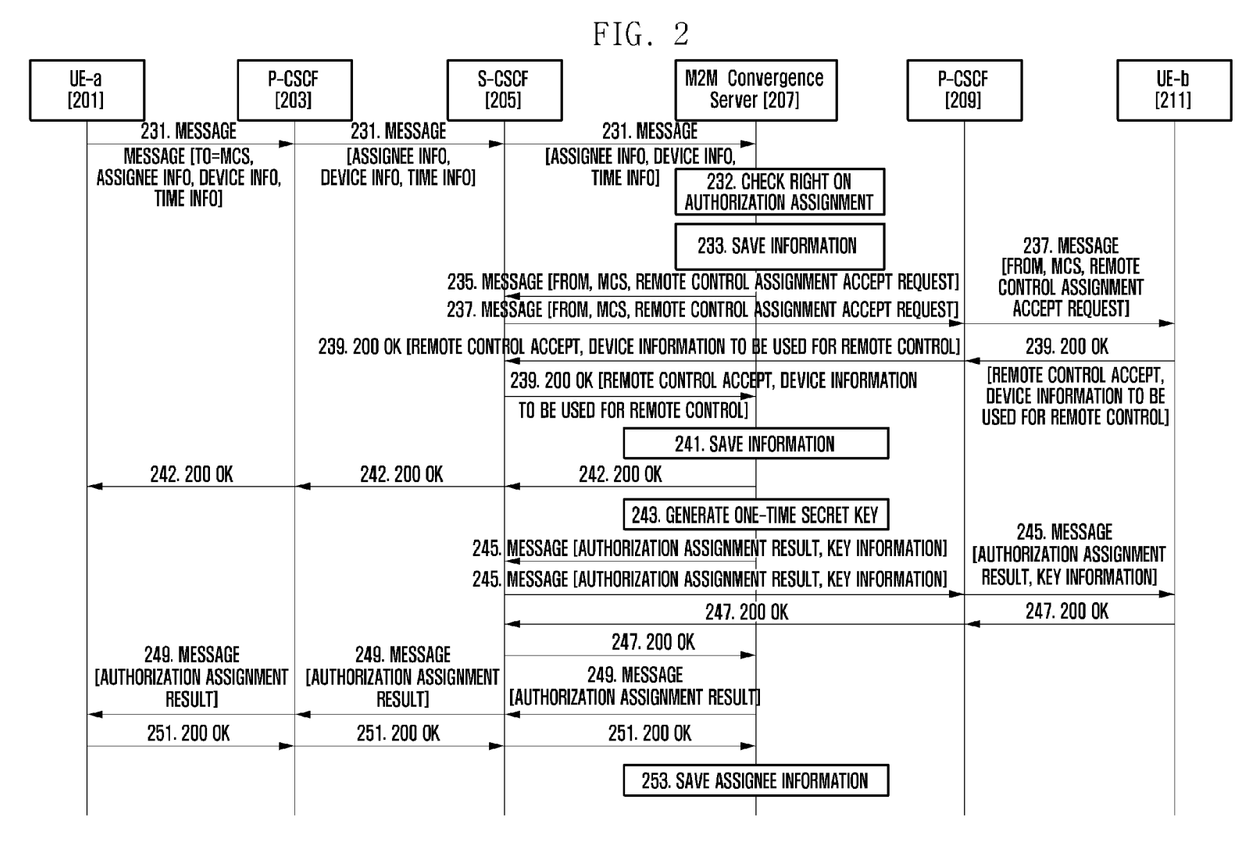
FIG. 2 illustrates an authentication procedure for authorization assignment for the control of a terminal in a communication system according to an embodiment of the present invention.

FIG. 2 illustrates an authentication procedure for authorization assignment for the control of a terminal in a communication system according to an embodiment of the present invention.

Referring to FIG. 2, the UE-a 201 sends the M2M convergence server 207 an authorization assignment request message for assigning the control authorization to the UE-b 211 via a Proxy-Call Session Control Function (P-CSCF) 203 and a Serving-Call Session Control Function (S-CSCF) 205 (231). The P-CSCF 203 works as an initial access point through which the terminal connects to the IMS and supports the communication of the terminals within the network. The S-CSCF 205 provides Public Service Indication (PSI) function and is responsible for the session state management function of the IP Multimedia Subsystem (IMS).

The authorization assignment request message includes the identity information of the UE-a 201 as the authorization assigner terminal, the identity information of the UE-b 211 as the authorization assignee terminal, the identity information of the M2M device of which remote control is assigned to the UE-b 211, the authorization assignment duration for which the UE-b can control the M2M device, and a security key for when the UE-a 201 assigns the control authorization to the UE-b 211. The authorization assignment request message is transmitted in the form of a Session Initiation Protocol (SIP) MESSAGE, which includes a 'To' field containing a representative phone number (MSISDN format) or an address in Network Access Identifier (NAI) format, and the information necessary for authorization assignment is carried in the body of the SIP MESSAGE.

The information carried in the body can be delivered in one of an Extensible Markup Language (XML), Binary, and Plain Text format. Although the description is directed to the case where the information is transmitted In SIP MESSAGE under the assumption of IMS-based MMS, the information can be transmitted in an SMS message, in which case the UE-a 201 sends the authorization request message with a representative phone number available routing to the M2M convergence server 207.

Upon receipt of the authorization assignment request message, the M2M convergence server 207 determines whether the UE-a 201 has the right to request the authorization assignment (232). That is, the M2M convergence server 207 can verify that the UE-a 201 has the control to the function execution terminal based on the security key included the authorization assignment request message. If the UE-a 201 is verified as the user terminal having the right to request authorization assignment, the M2M convergence server 207 saves the information (information on the UE-b 211 as the authorization assignee terminal, the M2M device as the target of the remote control, and the authorization assignment duration) contained in the authorization assignment request message transmitted by the UE-a 201 (233).

The M2M convergence server 207 notifies the UE-b 211 as the authorization assignee terminal of the authorization assignment for remote control via the S-CSCF 205 and sends an authorization assignment accept request message to the UE-b 211 via P-CSCF 209 (237). The M2M convergence server 207 sends the detailed information for authorization assignment such as M2M device information and authorization assignment duration along with the authorization assignment accept request message, and sends the UE-b 211 an SIP MESSAGE or SMS message having the sender field (i.e., To) set to the IMS-based address value (i.e., NAI) transmitted by the UE-a 201 or the MSIDN (i.e., phone number) and writes the detailed information on the authorization assignment in the SIP MESSAGE body or SMS message.

Upon receipt of the authorization assignment accept request message, the UE-b 211 sends the M2M convergence server 207 an authorization assignment accept message with the information on the terminal to be remotely controlled via the S-CSCF 205 (239). The M2M convergence server 207 saves the information transmitted by the UE-b 211 along with the information on the UE-b 211 as the authorization assignee terminal (241).

The UE-b 211 accepts the authorization requested by the UE-a 201, and the M2M convergence server 207 that acquired the information necessary for verifying the authorization assignment procedure notifies the UE-a 201 that the authorization assignment request is successfully authenticated (242). The M2M convergence server 207 generates a one-time secret key to be used when the UE-b 211 controls the M2M device (243), and sends the UE-b 211 a message containing the one-time secret key to be used in the remote control process along with the successful authorization assignment process result (245). Upon receipt of this message, the UE-b 211 sends the M2M convergence server 207 a response message notifying of the successful receipt of the message via the S-CSCF 205 (247).

If the response message indicating the successful receipt of the message is received from the UE-b 211, the M2M convergence server 207 sends the UE-a 201 requested for the authorization assignment a message notifying of the successful authorization assignment via the S-CSCF 205 and P-CSCF 203 (249). Upon receipt of this notification message, the UE-a 201 sends the M2M convergence server 207 a response message (251). If the response message is received from the UE-a 201, the M2M convergence server 207 saves the information on the UE-b 211 accepted the authorization assignment (253).

Figure 3:
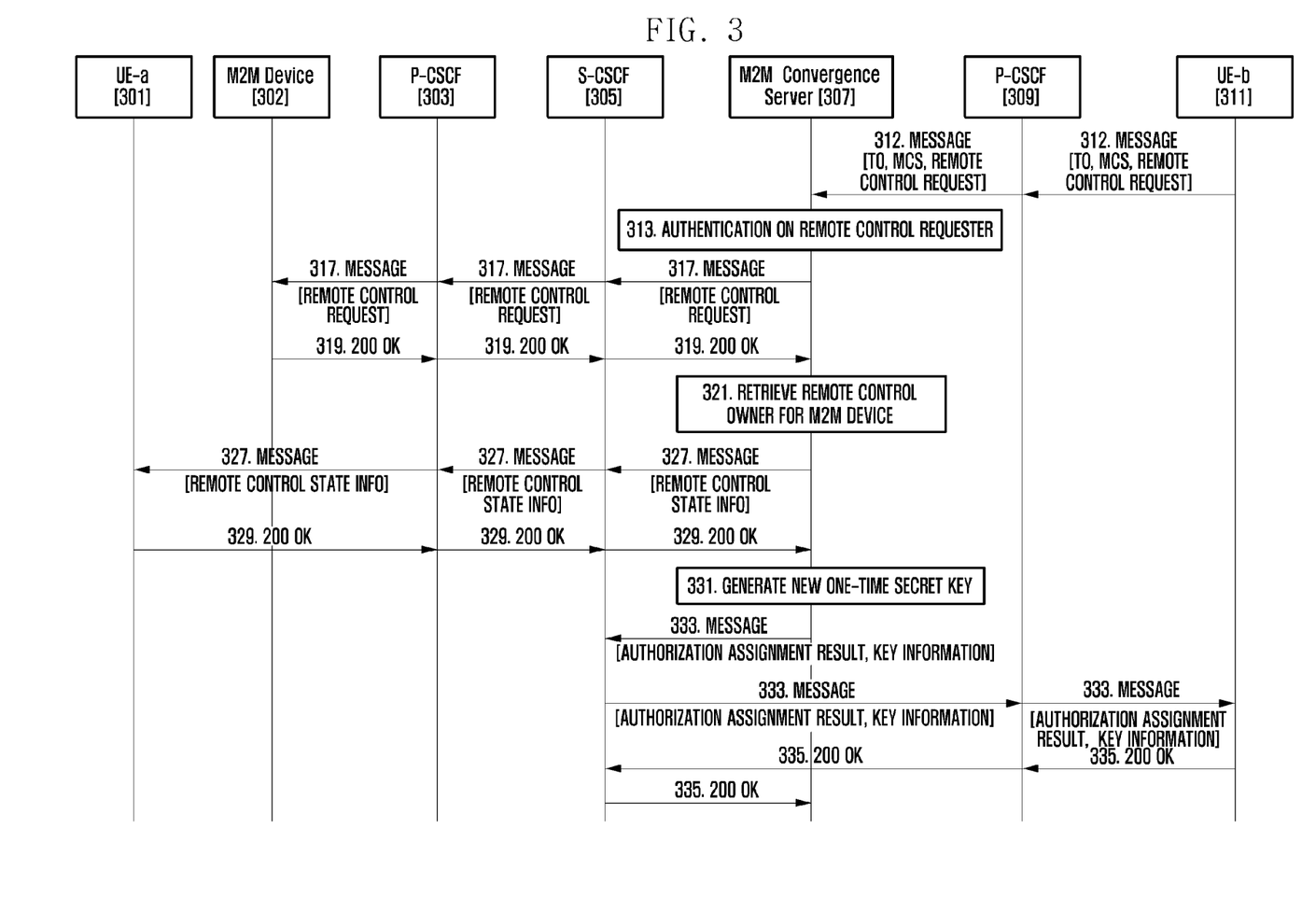
FIG. 3 illustrates a method for controlling a terminal in a communication system according to an embodiment of the present invention.

FIG. 3 illustrates a method for controlling a terminal in a communication system according to an embodiment of the present invention.

Referring to FIG. 3, the UE-b 311 sends the M2M convergence server 307 a remote control request message for controlling a function execution terminal via the P-CSCF 309 (312). Upon receipt of the remote control request message, the M2M convergence server 307 performs authentication on the UE-b 311 (313). In the authentication process, the M2M convergence server 307 determines whether the device information of the UE-b 311 and the terminal used for transmitting the remote control message, remote control request arrival time information, and the device information of the M2M device for which the remote control is requested are identical with the information acquired from the authorization assignment request message transmitted by the UE-a 301 assigning the authorization. The M2M convergence server 307 also determines whether the information such as the message authentication code carried along with the authorization assignment request message transmitted by the UE-b 311 is identical with the message authentication code generated based on the one-time secret key delivered to the UE-b 311.

When the information transmitted by the UE-b 311 is in the range configured by the UE-a 301 and the one-time secret key transmitted by the UE-b 311 is valid, the M2M convergence server 307 sends a remote control request message to the corresponding M2M device 302 (317). Upon receipt of the remote control request message, the M2M device 302 sends the M2M convergence server 307 a remote control response message carrying the function execution result or remotely-requested information (319).

The M2M convergence server 307 retrieves the information on the UE-a 301 as the original owner of the remote control authorization to the M2M device 302 based on the device information of the UE-b 311 as the authorization assignee terminal and the M2M device 302 (321). The M2M convergence server sends the UE-a 301a message containing the remote control status information of the UE-b 311 to the M2M device 302 (327). Upon receipt of this message, the UE-a 301 sends the M2M convergence server 307 a response message (329). The messages exchanged between the authorization assignor terminal and M2M convergence server 307 and the messages exchanged between the authorization assignee terminal and the M2M convergence server, are transmitted in SIP MESSAGE format.

The M2M convergence server 307 generates a new one-time secret key to be used when the UE-b 311 re-sends the remote control request message (331). The M2M convergence server 307 sends the UE-b 311 the execution result on the remote control command transmitted by the UE-b 311 and the one-time secret key information to be used for the next remote control (333). Upon receipt of the information transmitted by the M2M convergence server 307, the UE-b 311 sends the M2M convergence server 307 a response message (335). In more detail, the UE-b 311 sends the SIP 200 OK response message to inform of the successful receipt of the SIP MESSAGE transmitted by the M2M convergence server 307.

Figure 4:
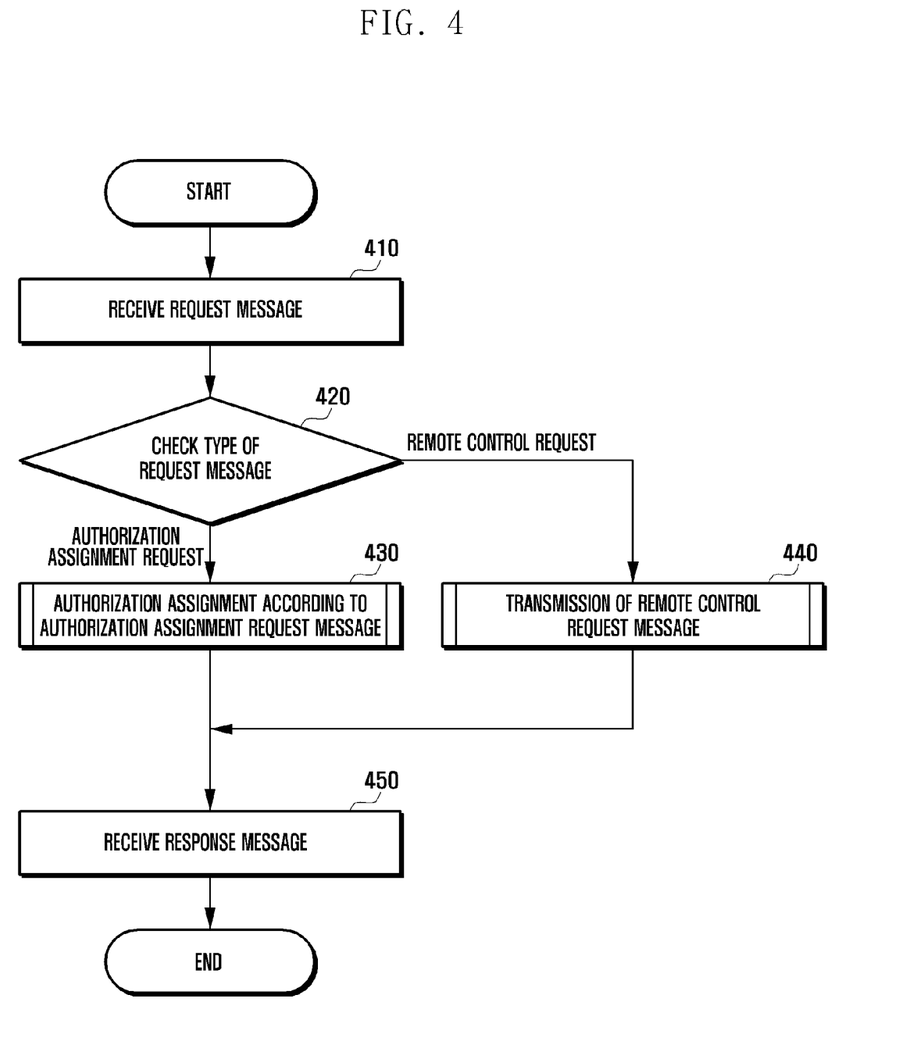
FIG. 4 illustrates a method for processing a message for controlling a terminal in a terminal management server according to an embodiment of the present invention.

FIG. 4 illustrates a method for processing a message for controlling a terminal in a terminal management server according to an embodiment of the present invention.

Referring to FIG. 4, the M2M convergence server receives a request message transmitted by a terminal (410). Upon receipt of the request message, the M2M convergence server determines the type of the request message (420), which can be an authorization assignment request message for handing over the authorization for controlling a function execution terminal or a remote control request message for controlling the function execution message.

If the request message is the authorization assignment request message, the M2M convergence server performs authorization assignment process according to the authorization assignment request message (430). A detailed description of step 430 will be made with reference to FIG. 5.

Otherwise, if the request message is the remote control request message, the M2M convergence server sends a remote control message to the corresponding function execution terminal according to the configured authorization assignment (440). A detailed description of step 440 will be made with reference to FIG. 6.

The M2M convergence server sends an execution result to the terminal that has requested for the authorization assignment or remote control and receives a response message from the corresponding terminal (450).

Figure 5:
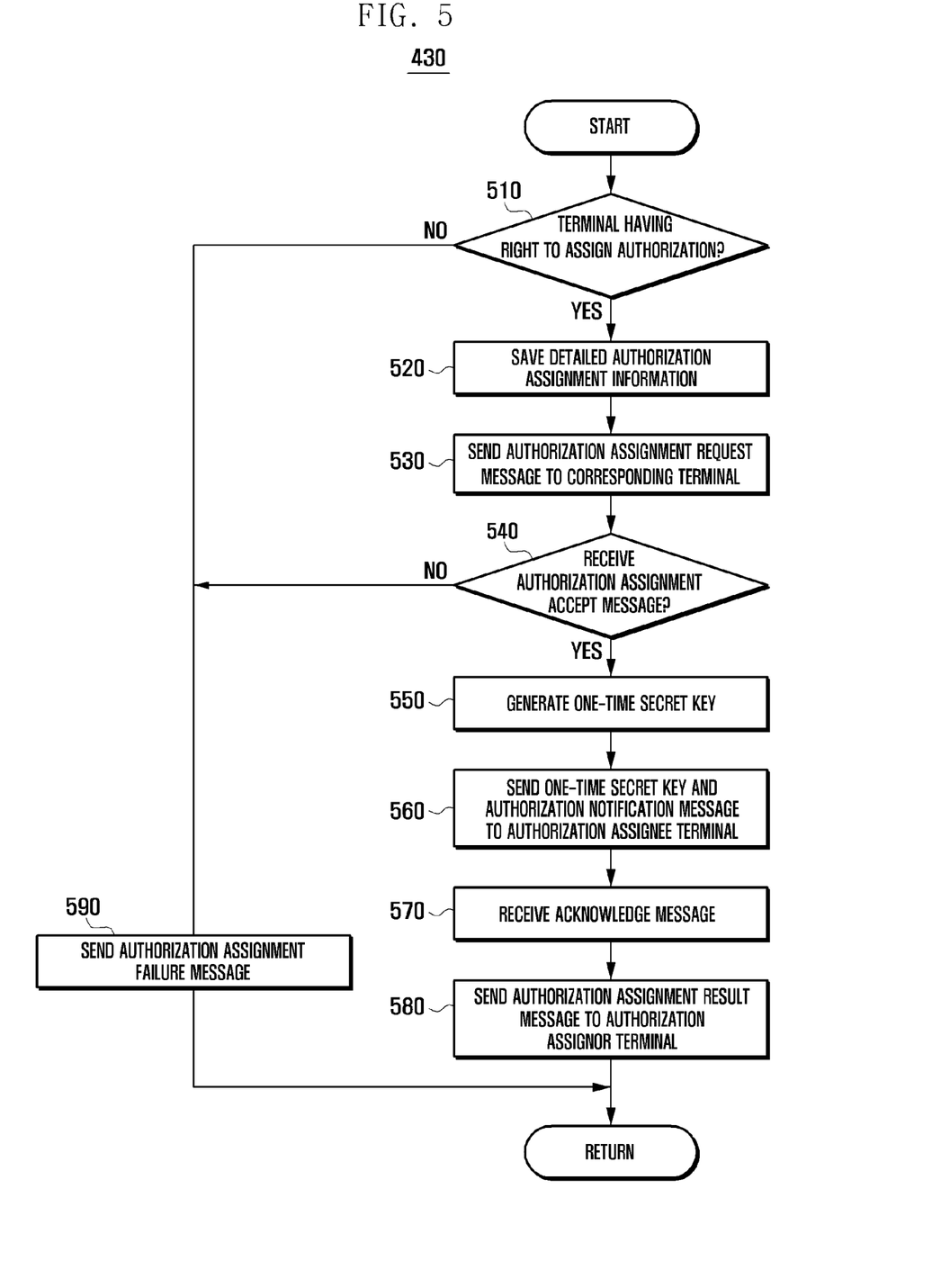
FIG. 5 illustrates steps of the authorization assignment procedure of FIG. 4.

FIG. 5 illustrates steps of the authorization assignment procedure 430 of FIG. 4.

Referring to FIG. 5, the M2M convergence server determines whether the first terminal that transmitted the authorization assignment request message is a valid terminal for the authorization assignment (510). The M2M convergence server can verify the validity of the terminal based on the security key assigned to the authorization assignor terminal and the function execution terminal.

If the first terminal is a valid terminal that can assign the authorization, the M2M convergence server saves the detailed authorization assignment information carried in the authorization assignment request message (520). The detailed authorization assignment information includes the device information of the UE-a as the authorization assignor terminal, the device information of the UE-b as the authorization assignee terminal, the device information of the M2M device to be remotely controlled by the UE-b, the authorization assignment duration information for restricting the authorization of the UE-b for controlling the M2M device, and the security key information for use in assigning the authorization from the UE-UE-a to UE-b.

The M2M convergence server sends an authorization assignment request message to the second terminal to which the first terminal requests for the authorization assignment (530). The M2M convergence server determines whether the authorization assignment accept message from the second terminal (540). If the authorization assignment accept message is received, the M2M convergence server generates the one-time secret key (550) which, for example, can be generated with the password generation method creating the key by combining a plurality of digits or an encipher hash function such as Message-Digest algorithm (MD5).

The M2M convergence server sends the generated authentication key and the authorization assignment notification message to the second terminal (560). The M2M convergence server receives the acknowledgement message informing the safe receipt of the message transmitted by the second terminal (570). The M2M convergence server sends the authorization assignment result message to the first terminal that has requested the authorization assignment (580).

Returning to step 510, if the first terminal is an invalid terminal, the M2M convergence server sends the first terminal an authorization assignment failure message (590). Also, if the authorization assignment accept message is not received at step 540 from the second terminal, the M2M convergence server sends the first terminal the authorization assignment failure message (590).

Figure 6:
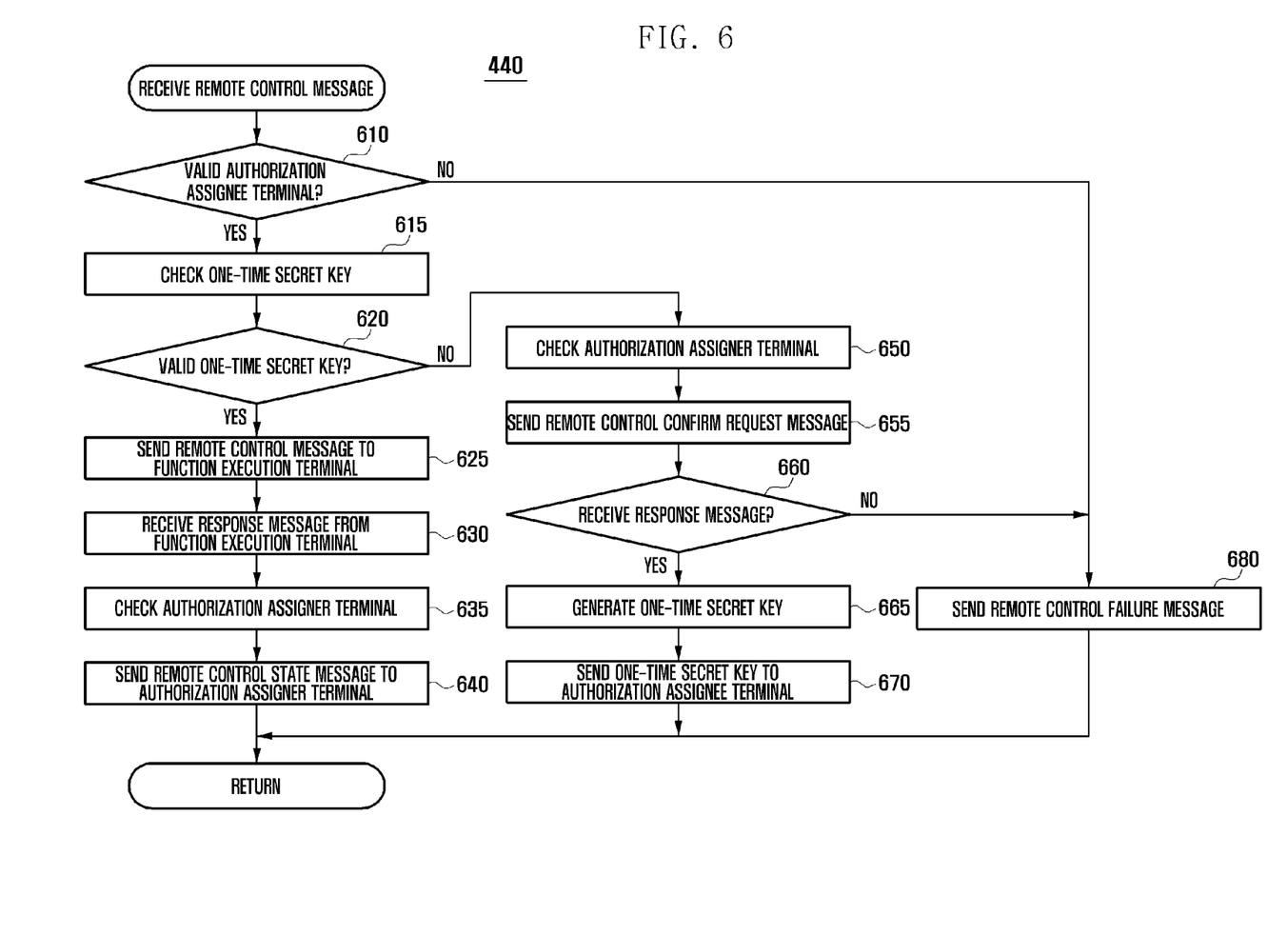
FIG. 6 illustrates a remote control method according to an embodiment of the present invention.

FIG. 6 illustrates a remote control method according to an embodiment of the present invention.

Referring to FIG. 6, when a remote control message is received, the M2M convergence server determines whether the second terminal that has transmitted the remote control message, is the authorization assignee terminal, which has accepted the authorization assignment (610). The M2M convergence server can determine whether the second terminal is the authorization assignee terminal by referencing the detailed information on the authorization assignee terminal that has been acquired in the authorization assignment process.

If it is determined that the second terminal is the authorization assignee terminal, the M2M convergence server checks the one-time secret key carried in the remote control message transmitted by the second terminal (615). The M2M convergence server determines whether the one-time secret key is valid (620). As to validity, if the one-time secret key is a combination of 5 digits, the M2M compares the password of the one-time secret key contained in the remote control message with the previously saved password. If the two passwords are identical with each other, the M2M convergence server determines that the one-time secret key is valid. Once the validity of the one-time secret key is verified, the M2M convergence server can delete the saved password.

When the one-time secret key is valid, the M2M convergence server sends the remote control message to the third terminal as a function execution terminal (625). The M2M convergence server can deliver the remote control message using the information on the M2M device to be remotely controlled that is extracted from the information contained in the remote control message. The M2M convergence server determines the first terminal that has requested for the authorization assignment to the second terminal (635).

The M2M convergence server sends a remote control status message to the first terminal (640). The remote control status message includes the device information on the second terminal as the authorization assignee terminal and the information on the function executed by the third terminal in response to the remote control message. Although not depicted in the drawings, the M2M convergence server can receive the remote control request message from the second terminal and regenerate the one-time secret key for the next remote control request message to the second terminal. If the one-time secret key for the next remote control request message is received, the second terminal can transmit the remote control request message for controlling the third terminal with the regenerated one-time secret key.

Returning to step 620, if the two passwords are not identical with each other, the M2M convergence server checks the first terminal that has requested the second terminal for the authorization assignment (650). The M2M convergence server sends the first terminal a remote control confirm request message (655) for inquiring whether the remote control request message for controlling the third terminal is received from the second terminal and whether to accept the remote control for the third terminal to the second terminal.

The M2M convergence server determines whether a response message is received (660). It is assumed that the response is transmitted only when the remote control assignment to the second terminal for controlling the third terminal. If the response message is received, the M2M convergence server generates the one-time secret key (665), and sends the one-time secret key to the second terminal as the authorization assignee terminal (670). Although not depicted in the drawings, if the remote control request message is received again from the second terminal, the M2M checks the one-time secret key and delivers the received remote control request message to the third terminal.

Returning to step 610, if the second terminal is not the authorization assignee terminal, the M2M convergence server generates a remote control failure message to the second terminal (680). If no response message is received from the first terminal at step 660, the M2M convergence server generates the remote control failure message to the second terminal (680).

Figure 7:
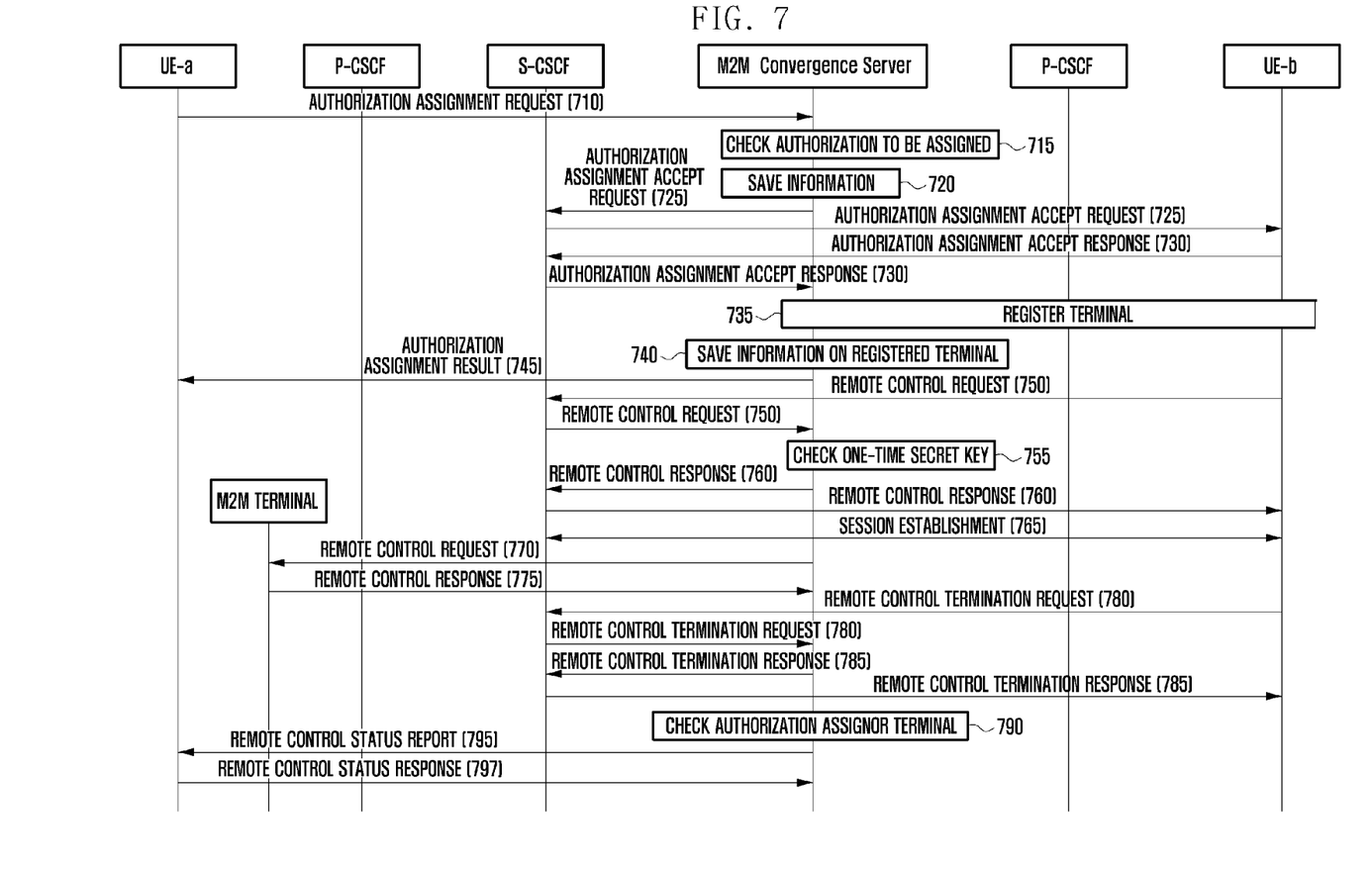
FIG. 7 illustrates a terminal control method according to the second embodiment of the present invention.

FIG. 7 illustrates a terminal control method according to the second embodiment of the present invention.

Referring to FIG. 7, the UE-a sends an authorization assignment request message to the M2M convergence server to request for the authorization assignment to the UE-b (710). The authorization assignment request message includes the information on the UE-a as the assignment assignor terminal, the UE-b as the assignment assignee terminal and the M2M device to be remotely controlled by the UE-b assigned the control authorization, the authorization assignment duration for which the authorization for controlling the M2M device is maintained, and the security key information used when the authorization is assigned from the UE-a to the UE-b.

Upon receipt of the authorization request message, the M2M convergence server determines whether the UE-a has the right to request for the authorization assignment (715). The M2M convergence server can determine whether the UE-a has the authorization for controlling a function execution terminal based on the security key contained in the authorization assignment request message. If the UE-a is the valid terminal that can request authorization assignment, the M2M convergence server saves the information (information on the UE-b as the authorization assignee terminal, information on the M2M device to be remotely controlled, and authorization assignment time duration) contained in the authorization assignment request message received from the UE-a (720).

The M2M convergence server notifies the UE-b of the assignment of the authorization for controlling a function execution terminal by sending an authorization assignment accept request message to the UE-b (725). Upon receipt of the authorization assignment accept request message, the UE-b sends the M2M convergence server an authorization assignment accept response message (730). If the authorization assignment accept response message is received, the M2M convergence server registers the UE-b (735) and saves the information on the registered UE-b (740). Although not depicted in the drawings, the M2M convergence server can issue a one-time secret key to the UE-b. The M2M convergence server notifies the UE-a of the authorization assignment result (745).

The UE-b then sends the M2M convergence server a remote control request message for controlling the function execution terminal (750). If the remote control request message is received, the M2M convergence server performs authentication on the UE-b, which has requested for the remote control (755). For this purpose, the M2M convergence server determines whether the information on the UE-b and the terminal used for transmitting the remote control message, the remote control request arrival time information, and information on the M2M device requested to be controlled are identical with the corresponding information provided by the UE-a as the authorization assignor terminal, and determines whether the message authentication code contained in the remote control request message transmitted by the UE-b is identical with the message authentication code generated based on the information and the one-time secret key transmitted to the UE-b.

When the information received from the UE-b is in the range defined by the UE-a as the authorization assignee terminal and the one-time secret key received from the UE-b is valid, the M2M convergence server sends the UE-b a remote control response message in response to the remote control request message through the S-CSCF (760). The M2M convergence server establishes a session with the UE-b (765).

The M2M convergence server then sends the M2M terminal a remote control message (770). If the remote control message is received, the M2M terminal executes the function as instructed by the remote control message and sends the M2M convergence server a remote control response message carrying the function execution result or remotely requested information (775).

If a control termination command is input by the user, the UE-b sends the M2M convergence server a remote control termination request message through the S-CSCF (780). In response to the remote control termination request message, the M2M convergence server sends the UE-b a remote control termination response message (785). The M2M convergence server can delete the one-time secret key assigned to the UE-b, and can generate the one-time secret key for the next remote control request and send the UE-b the response message containing the one-time secret key.

The M2M convergence server checks the information on the UE-a as the original owner of the authorization for remote control of the M2M device based on the information of the UE-b and the M2M device to be remotely controlled, and sends the UE-a a remote control status report message containing the remote control status of the UE-2 controlling the M2M device (795). In response to the remote control status report message, the UE-a sends the M2M convergence server a remote control status response message (797). The messages exchanged between the authorization assignor terminal and the M2M convergence server and between the authorization assignee terminal and the M2M convergence server are transmitted in SIP MESSAGE format.

In the communication system according to the present invention, a one-time secret key is generated when the authorization is assigned, such that a function execution terminal can be controlled depending on whether the one-time secret key is valid. Through the above-described procedure, it is possible to reduce the authentication delay as compared to the conventional authorization assignment method with authorization certificate or combination of ID and password, and overcome the security problem.

While the present invention has been shown and described with reference to certain embodiments thereof, it will be understood by those skilled in the art that various changes in form and details may be made therein without departing from the spirit and scope of the invention as defined in the appended claims and their equivalents.

What is claimed is:

1. A terminal control method of a terminal management server in a communication system, comprising:
   receiving, from a first terminal, an authorization assignment request message for assigning, from the first terminal to a second terminal, control authorization for controlling a third terminal that executes a function in response to an external command;
   checking the second terminal in response to receipt of the authorization assignment request message;
   generating a one-time secret key as a result of the checking;
   transmitting the one-time secret key to the second terminal;
   receiving, from the second terminal, a remote control request message for controlling the third terminal with a second key;
   determining whether the second key received with the remote control request message is a valid according to the one-time secret key; and
   sending, when the second key is determined to be valid, the remote control request message to the third terminal,
   wherein sending the remote control request message comprises:
   transmitting, when the second key is determined to be invalid, a remote control confirm request message to the first terminal for confirming whether the first terminal attempts to assign the authorization for controlling the third terminal;
   regenerating, when a response message is received in response to the remote control confirm request message, the one-time secret key; and
   transmitting the regenerated one-time secret key to the second terminal.

2. The terminal control method of claim 1, wherein the authorization assignment request message comprises at least one of identity information of the second terminal, identity information of the third terminal, and authorization assignment time information for defining a time when the authorization assignment is to be withdrawn.

3. The terminal control method of claim 1, further comprising sending the first terminal a remote control status message reporting the function executed by the third terminal according to the remote control request message.

4. A terminal control communication system comprising:
a first terminal for assigning, from the first terminal to a second terminal, control authorization for controlling a function execution terminal executing a function in response to an external command;
a terminal management server for generating, when an authorization assignment request message is received from the first terminal, a one-time secret key and transmitting the generated one-time secret key to the second terminal; and
the second terminal for controlling the function execution terminal based on the assigned control authorization,
wherein the terminal management server receives, from the second terminal, after transmitting the one-time secret key to the second terminal, a remote control request message for controlling a third terminal along with a second key, determines whether the second key received with the remote control request message is a valid key according to the one-time secret key, and sends, when the second key is determined to be valid, the remote control request message to the third terminal, and,
wherein the terminal management server transmits, when the second key is determined to be invalid, a remote control confirm request message to the first terminal for confirming whether the first terminal attempts to assign the authorization for controlling the third terminal, regenerates, when a response message is received in response to the remote control confirm request message, the one-time secret key, and transmits the regenerated one-time secret key to the second terminal.

5. The terminal control communication system of claim 4, wherein the authorization assignment request message comprises at least one of identity information of the second terminal, identity information of the third terminal, and authorization assignment time information for defining a time when the authorization assignment is to be withdrawn.

6. The terminal control communication system of claim 4, wherein the terminal management server sends the first terminal a remote control status message reporting a function executed by the third terminal according to the remote control request message.

* * * * *